United States Patent
Fukuta et al.

(10) Patent No.: US 9,686,708 B2
(45) Date of Patent: Jun. 20, 2017

(54) COMMUNICATION CONTROL METHOD, USER TERMINAL, NETWORK DEVICE, AND BASE STATION

(71) Applicant: KYOCERA CORPORATION, Kyoto (JP)

(72) Inventors: Noriyoshi Fukuta, Yokohama (JP); Masato Fujishiro, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 14/779,032

(22) PCT Filed: Mar. 24, 2014

(86) PCT No.: PCT/JP2014/058058
§ 371 (c)(1),
(2) Date: Sep. 22, 2015

(87) PCT Pub. No.: WO2014/157074
PCT Pub. Date: Oct. 2, 2014

(65) Prior Publication Data
US 2016/0057643 A1 Feb. 25, 2016

Related U.S. Application Data

(60) Provisional application No. 61/805,028, filed on Mar. 25, 2013.

(51) Int. Cl.
*H04W 24/10* (2009.01)
*H04W 16/18* (2009.01)
*H04W 88/06* (2009.01)

(52) U.S. Cl.
CPC .......... *H04W 24/10* (2013.01); *H04W 16/18* (2013.01)

(58) Field of Classification Search
CPC ...................................... H04W 88/06
See application file for complete search history.

(56) References Cited

U.S. PATENT DOCUMENTS

| | | | |
|---|---|---|---|
| 2010/0330921 A1* | 12/2010 | Kim ...... | H04W 24/10 455/67.11 |
| 2011/0201279 A1* | 8/2011 | Suzuki .... | H04W 24/10 455/67.11 |
| 2011/0306345 A1* | 12/2011 | Wu ........ | H04W 24/10 455/436 |
| 2012/0044822 A1* | 2/2012 | Kim ...... | H04W 24/10 370/252 |

(Continued)

OTHER PUBLICATIONS

3GPP Technical Specification, "3GPP TS 37.320 V11.2.0", Release 11, Dec. 2012.
International Search Report, PCT/JP2014/058058, Jun. 10, 2014.

*Primary Examiner* — Cindy Trandai
(74) *Attorney, Agent, or Firm* — Studebaker & Brackett PC

(57) ABSTRACT

A communication control method according to the present invention comprises: a step A of notifying, by UE 100 in a connected state, a MME/S-GW300 of RAT information on an MDT support RAT that is a radio access technology (RAT) on which the user terminal supports an MDT measurement; and a step B of setting to the UE 100, by network device, a PLMN (public land mobile network) list indicating a public land mobile network that permits MDT measurement, on the basis of RAT information.

7 Claims, 11 Drawing Sheets

(56) References Cited

U.S. PATENT DOCUMENTS

| | | | | |
|---|---|---|---|---|
| 2012/0092998 | A1* | 4/2012 | Chang | H04W 24/10 |
| | | | | 370/241 |
| 2012/0178465 | A1* | 7/2012 | Lin | H04W 24/10 |
| | | | | 455/450 |
| 2012/0309404 | A1* | 12/2012 | Suzuki | H04W 24/10 |
| | | | | 455/450 |
| 2012/0329402 | A1* | 12/2012 | Ren | H04W 24/10 |
| | | | | 455/67.11 |
| 2013/0045735 | A1* | 2/2013 | Kim | H04W 24/10 |
| | | | | 455/422.1 |
| 2013/0065535 | A1* | 3/2013 | Zhou | H04W 16/18 |
| | | | | 455/67.11 |
| 2013/0109320 | A1* | 5/2013 | Tomala | H04W 24/10 |
| | | | | 455/67.11 |
| 2013/0109322 | A1* | 5/2013 | Hapsari | H04W 24/10 |
| | | | | 455/67.13 |
| 2013/0114446 | A1* | 5/2013 | Liu | H04W 24/10 |
| | | | | 370/252 |
| 2013/0178216 | A1* | 7/2013 | Chang | H04W 24/10 |
| | | | | 455/437 |
| 2013/0183978 | A1* | 7/2013 | Keskitalo | H04W 24/10 |
| | | | | 455/436 |
| 2013/0190011 | A1* | 7/2013 | Kim | H04W 24/10 |
| | | | | 455/456.1 |
| 2013/0196604 | A1* | 8/2013 | Jung | H04W 24/02 |
| | | | | 455/67.11 |
| 2014/0051428 | A1* | 2/2014 | Jung | H04W 24/08 |
| | | | | 455/422.1 |
| 2014/0128057 | A1* | 5/2014 | Siomina | H04J 3/0685 |
| | | | | 455/423 |
| 2014/0295847 | A1* | 10/2014 | Futaki | H04W 36/0055 |
| | | | | 455/436 |
| 2015/0056925 | A1* | 2/2015 | Jung | H04W 24/10 |
| | | | | 455/67.11 |

* cited by examiner

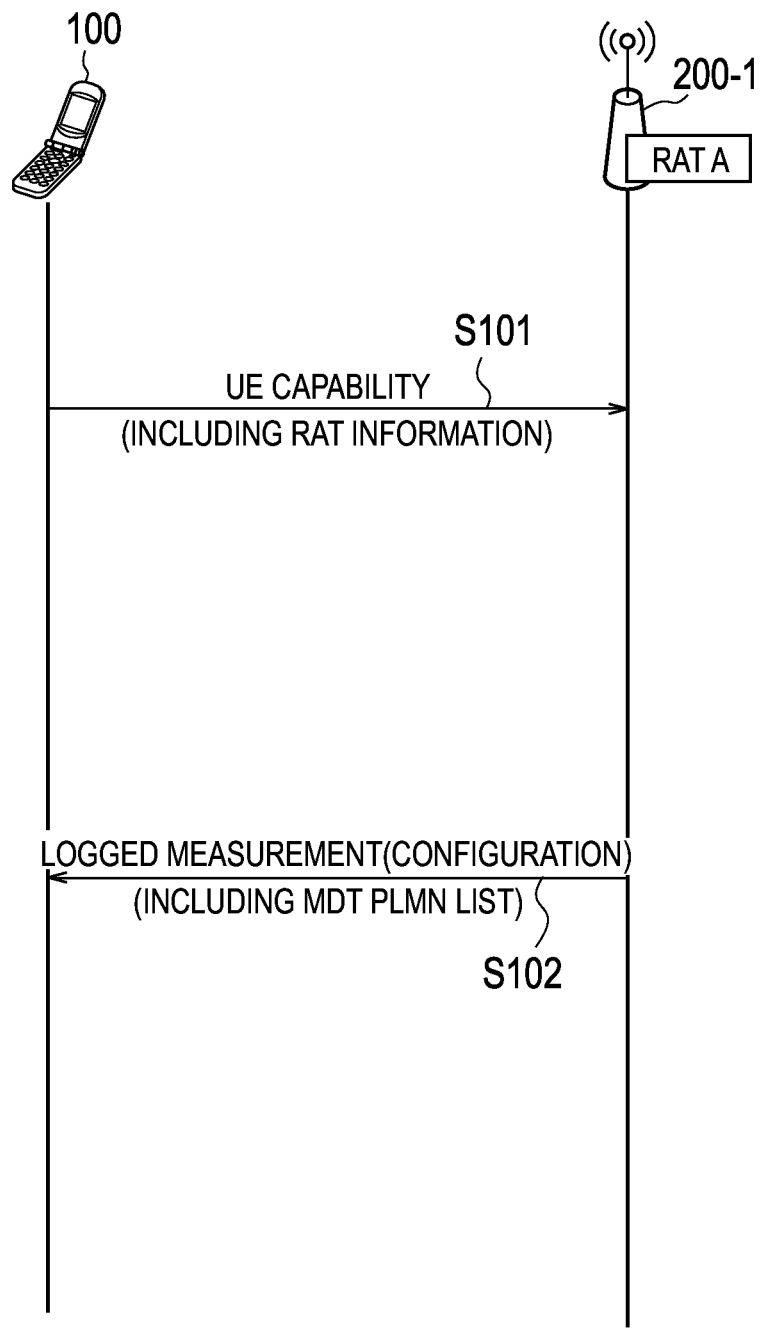

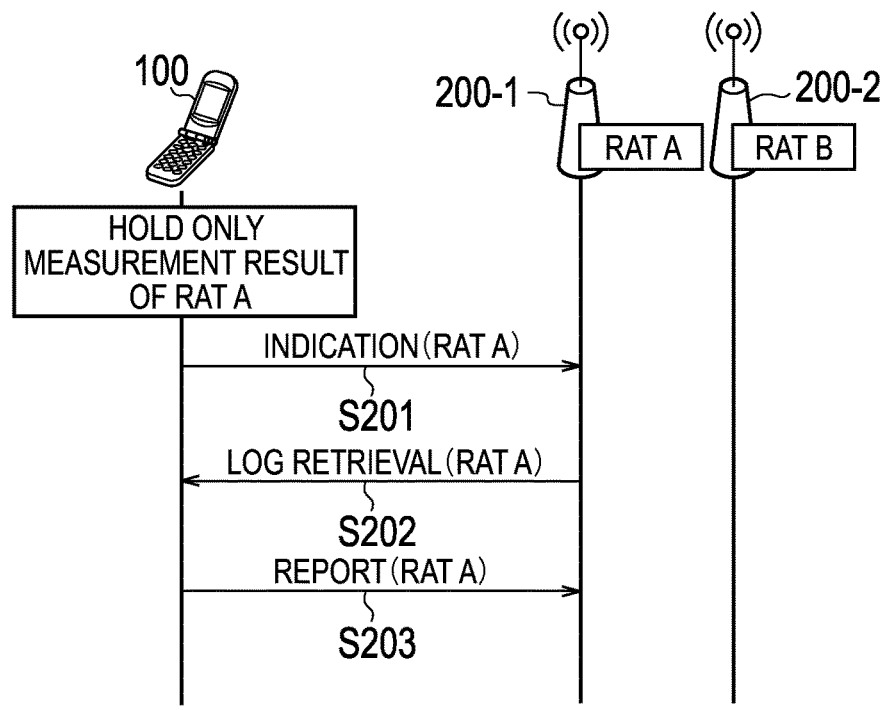
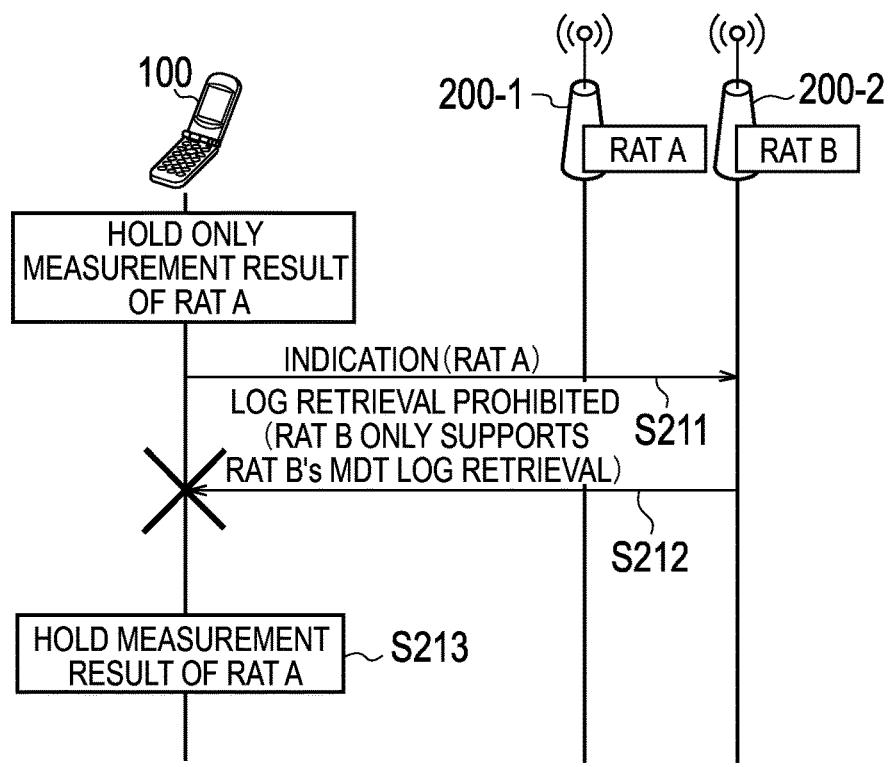

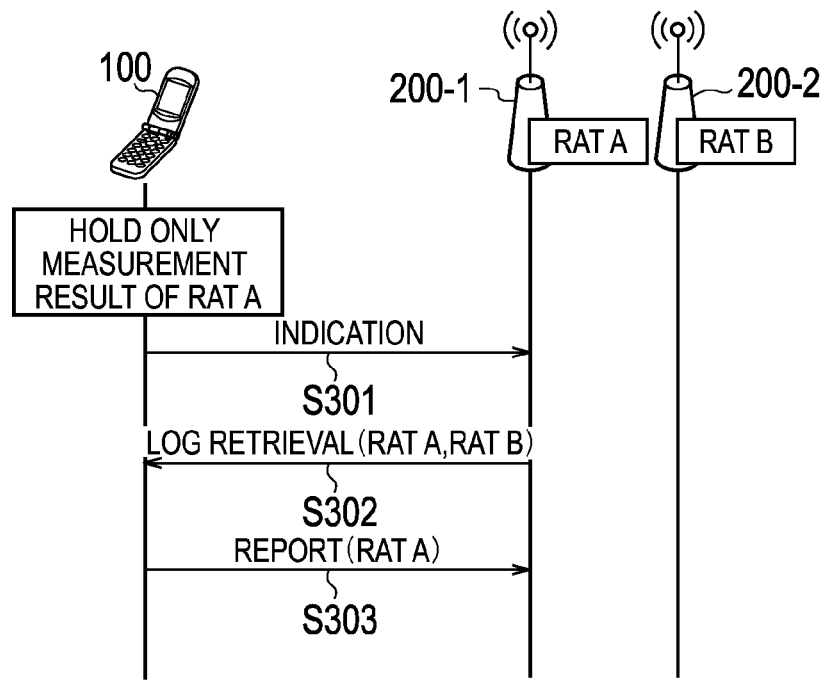
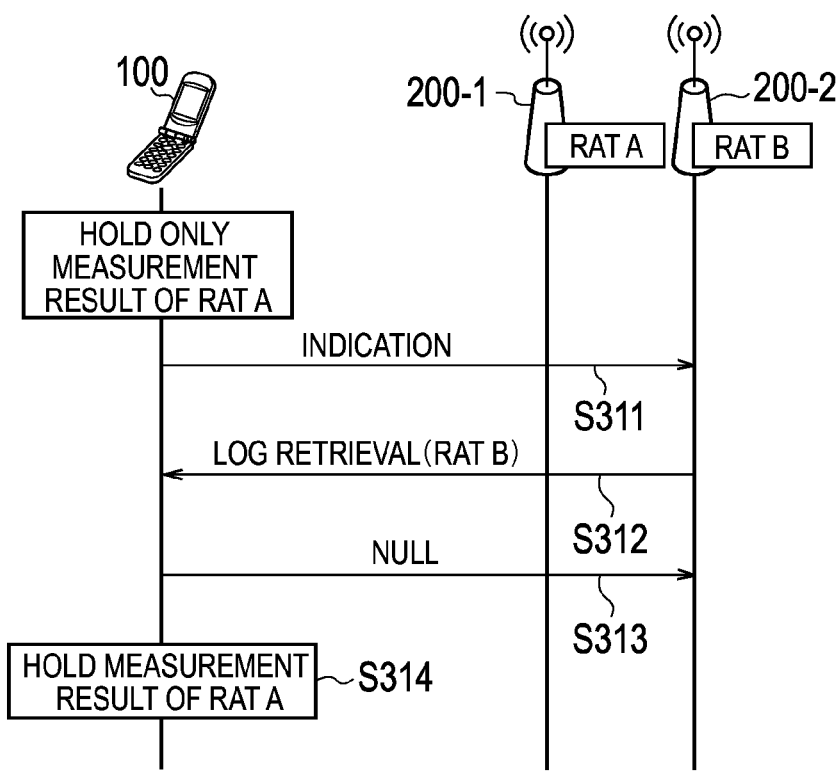

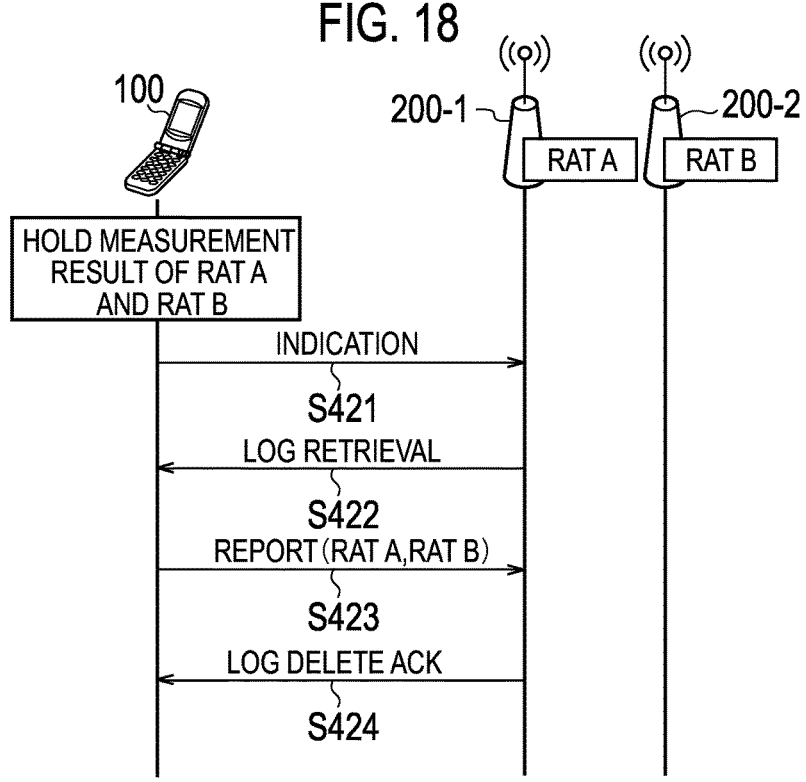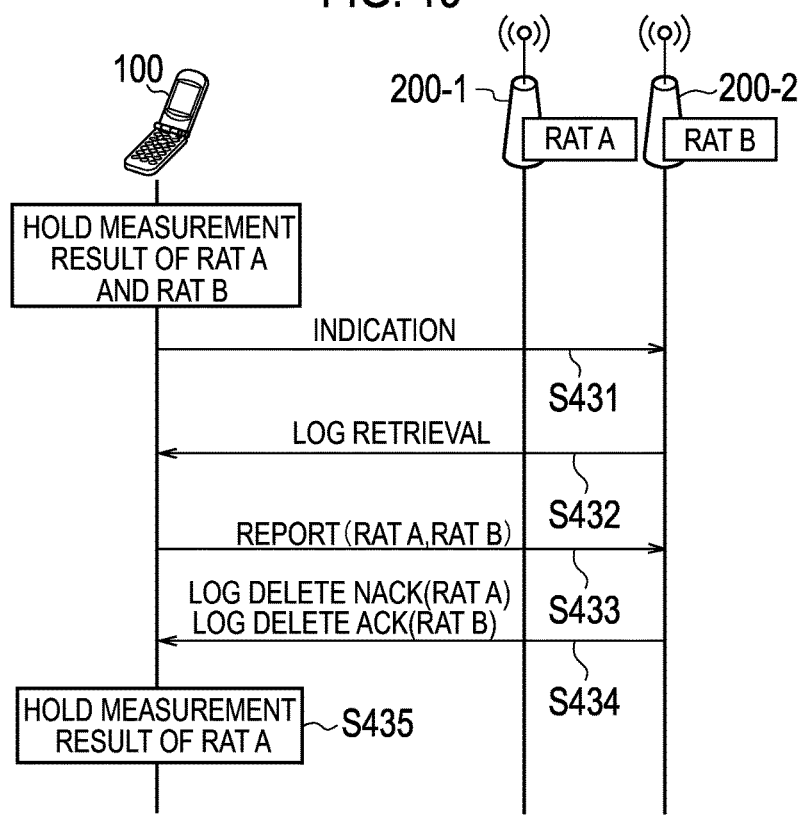

COMMUNICATION CONTROL METHOD, USER TERMINAL, NETWORK DEVICE, AND BASE STATION

TECHNICAL FIELD

The present invention relates to a communication control method, a user terminal, a network device, and a base station used in a mobile communication system that supports MDT.

BACKGROUND ART

In 3GPP (3rd Generation Partnership Project), which is a project aiming to standardize a mobile communication system, following Release 10, the specifications for MDT (Minimization of Drive Tests) are being developed (see, Non Patent Literature 1, for example). In the MDT, a user terminal measures a radio environment (MDT measurement) and reports a measurement result and location information of the user terminal to a network.

Further, in the MDT, the user terminal is capable of performing the MDT measurement for a plurality of public land mobile network (PLMN) different in operator (communications provider). When a PLMN list indicating a PLMN that permits the MDT measurement is set from the network, the user terminal performs the MDT measurement in the PLMN included in the PLMN list.

PRIOR ART DOCUMENT

Non-Patent Document

[Non Patent Literature 1] 3GPP Technical Specification "3GPP TS37.320 V11.2.0" December, 2012

SUMMARY OF THE INVENTION

However, the user terminal does not necessarily support the MDT measurement on all the radio access technologies (RAT). For example, the user terminal which supports the MDT measurement on an LTE radio access technology does not necessarily support the MDT measurement on a W-CDMA radio access technology.

Thus, the user terminal is not capable of performing the MDT measurement in a PLMN not belonging to an RAT (MDT support RAT) on which the user terminal supports the MDT measurement. Therefore, when the PLMN list set to the user terminal includes the PLMN not belonging to the MDT support RAT, an unexpected error may occur.

Accordingly, the present invention provides a communication control method, a user terminal, a network device, and a base station, with which it is possible to appropriately control an MDT measurement in a plurality of PLMNs.

A communication control method according to the present invention comprises: a step A of notifying, by a user terminal, when the user terminal is in a connected state, a network device of RAT information on a radio access technology (RAT) on which the user terminal supports an MDT measurement; and a step B of setting to the user terminal, by the network device, a PLMN (public land mobile network) list indicating a public land mobile network that permits the MDT measurement, on the basis of the RAT information.

BRIEF DESCRIPTION OF THE DRAWINGS

FIG. 7 is an operation sequence diagram of the MDT measurement setting according to the first embodiment.

FIG. 8 is a sequence diagram showing an operation pattern 1 of the measurement result report according to the first embodiment.

FIG. 9 is a sequence diagram showing an operation pattern 2 of the measurement result report according to the first embodiment.

FIG. 12 is a sequence diagram showing an operation pattern 1 of the measurement result report according to the second embodiment.

FIG. 13 is a sequence diagram showing an operation pattern 2 of the measurement result report according to the second embodiment.

FIG. 18 is a sequence diagram showing an operation pattern 3 of the measurement result report according to the third embodiment.

FIG. 19 is a sequence diagram showing an operation pattern 4 of the measurement result report according to the third embodiment.

DESCRIPTION OF EMBODIMENT

Summary of the Embodiment

Figure 1:
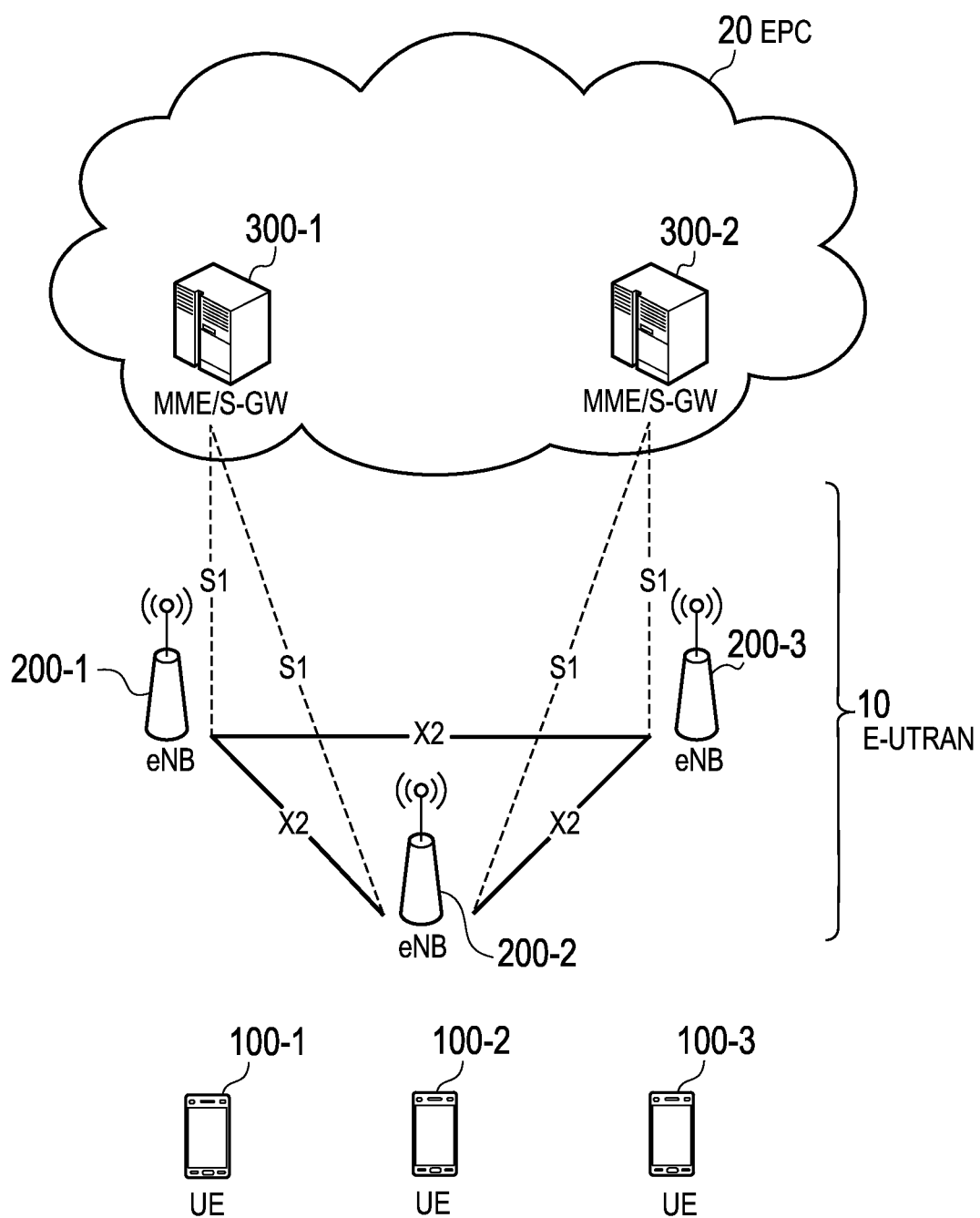
FIG. 1 is a configuration diagram of an LTE system according to the first embodiment to the third embodiment.

A communication control method according to the first embodiment to the third embodiment comprises: a step A of notifying, by a user terminal in a connected state, a network device of RAT information on an MDT support RAT that is a radio access technology (RAT) on which the user terminal supports an MDT measurement; and a step B of setting to the user terminal, by the network device, a PLMN (public land mobile network) list indicating a public land mobile network that permits the MDT measurement, on the basis of the RAT information.

In the first embodiment to the third embodiment, the communication control method further comprises: a step C of performing, by the user terminal in an idle state, the MDT measurement in a PLMN included in the PLMN list set on the basis of the RAT information.

In the first embodiment to the third embodiment, in the step A, the user terminal notifies the network device of the RAT information, in response to reception of a notification request for the RAT information from the network device.

In the first embodiment to the third embodiment, in the step B, the network device includes only a PLMN belonging to the MDT support RAT in the PLMN list, on the basis of the RAT information.

In the first embodiment to the third embodiment, in the step C, when the PLMN list includes a first PLMN belonging to the MDT support RAT and a second PLMN not belonging to the MDT support RAT, the user terminal does not perform the MDT measurement in the second PLMN but performs the MDT measurement in the first PLMN.

In the first embodiment, the communication control method further comprises: a step D of transmitting to a base station, by the user terminal that holds a measurement result by the MDT measurement, notification information indicating that the user terminal holds the measurement result. In the step D, the user terminal transmits identification information indicating an RAT corresponding to the measurement result with the notification information.

In the second embodiment, the communication control method further comprises: a step E of transmitting to the base station, by the user terminal that holds a measurement result by the MDT measurement, information indicating that the user terminal does not hold the measurement result, when the user terminal receives from the base station, a measurement result transmission request for an RAT other than RATs corresponding to the measurement result.

In the third embodiment, the communication control method further comprises: a step F of transmitting, by the user terminal that holds a measurement result by the MDT measurement, the measurement result to the base station, when the user terminal receives the measurement result transmission request from the base station; and a step G of transmitting to the user terminal, by the base station, deletion control information indicating whether or not to permit deletion of the measurement result on each of a plurality of RATs, when the measurement result includes measurement results corresponding to the plurality of RATs.

A user terminal according to the first embodiment to the third embodiment performs an MDT measurement in a public land mobile network (PLMN) included in a PLMN list, when the PLMN list indicating the PLMN that permits the MDT measurement is set from a network device. The user terminal comprises: a controller configured to notify, in a connected state, the network device of RAT information on an MDT support RAT that is a radio access technology (RAT) on which the user terminal supports an MDT measurement. The controller notifies the network device of the RAT information, before the PLMN list is set from the network device.

A network device according to the first embodiment to the third embodiment sets to a user terminal, a PLMN list showing a public land mobile network (PLMN) that permits an MDT measurement. The network device comprises: a controller configured to set the PLMN list to the user terminal, on the basis of RAT information on an MDT support RAT that is a radio access technology (RAT) on which the user terminal supports an MDT measurement.

A base station according to the third embodiment receives a measurement result from a user terminal that holds the measurement result by the MDT measurement. The base station comprises: a controller configured to transmit to the user terminal, deletion control information indicating whether or not to permit deletion of the measurement result on each of a plurality of RATs, when the measurement result includes measurement results corresponding to the plurality of RATs.

First Embodiment (Configuration of LTE System)

FIG. 1 is a configuration diagram of an LTE system according to the present embodiment. As illustrated in FIG. 1, the LTE system includes a plurality of UEs (User Equipment) 100, E-UTRAN (Evolved-UMTS Terrestrial Radio Access Network) 10, and EPC (Evolved Packet Core) 20. The E-UTRAN 10 corresponds to a radio access network and the EPC 20 corresponds to a core network. The E-UTRAN 10 and the EPC 20 configure a network of the LTE system.

The UE 100 is a mobile communication device and performs radio communication with a serving cell. The UE 100 corresponds to the user terminal.

The E-UTRAN 10 includes a plurality of eNBs 200 (evolved Node-B). The eNB 200 corresponds to a base station. Each eNB 200 manages one or a plurality of cells and performs radio communication with the UE 100 which establishes a connection with the cell of the eNB 200. It is noted that the "cell" is used as a term indicating a minimum unit of a radio communication area, and is also used as a term indicating a function of performing radio communication with the UE 100.

The eNB 200, for example, has a radio resource management (RRM) function, a routing function of user data, and a measurement control function for mobility control and scheduling.

The EPC 20 includes a plurality of MME (Mobility Management Entity)/S-GWs (Serving-Gateway) 300. The MME is a network device for performing various mobility controls and the like for the UE 100 and corresponds to a controller. The S-GW is a network device that performs transfer control of user data and corresponds to a mobile switching center. The EPC 20 including the MME/S-GW 300 accommodates the eNB 200.

The eNBs 200 are connected to one another via an X2 interface. Furthermore, the eNB 200 is connected to the MME/S-GW 300 via an S1 interface.

Next, the configurations of the UE 100 and the eNB 200 will be described.

Figure 2:
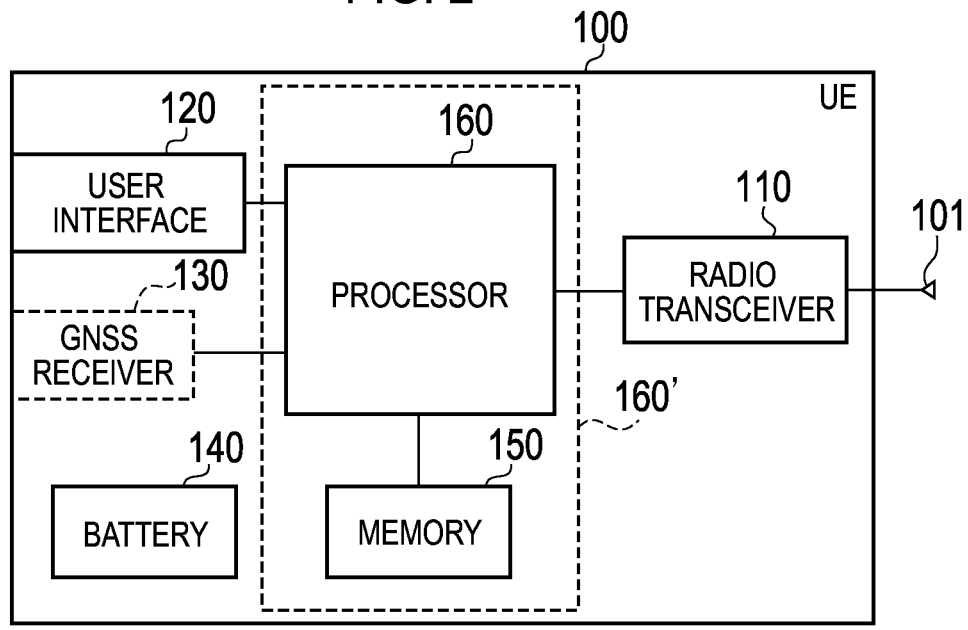
FIG. 2 is a block diagram of the UE according to the first embodiment to the third embodiment.

FIG. 2 is a block diagram of the UE 100. As illustrated in FIG. 2, the UE 100 includes an antenna 101, a radio transceiver 110, a user interface 120, a GNSS (Global Navigation Satellite System) receiver 130, a battery 140, a memory 150, and a processor 160. The memory 150 and the processor 160 configure a control unit. The UE 100 may not have the GNSS receiver 130. Furthermore, the memory 150 may be integrally formed with the processor 160, and this set (that is, a chip set) may be called a processor 160'.

The antenna 101 and the radio transceiver 110 are used to transmit and receive a radio signal. The radio transceiver 110 converts a baseband signal output from the processor 160 into the radio signal, and transmits the radio signal from the antenna 101. Furthermore, the radio transceiver 110 converts the radio signal received by the antenna 101 into the baseband signal, and outputs the baseband signal to the processor 160.

The user interface 120 is an interface with a user carrying the UE 100, and includes, for example, a display, a microphone, a speaker, and various buttons. The user interface 120 receives an operation from a user and outputs a signal indicating the content of the operation to the processor 160. The GNSS receiver 130 receives a GNSS signal in order to obtain location information indicating a geographical location of the UE 100, and outputs the received signal to the processor 160. The battery 140 accumulates a power to be supplied to each block of the UE 100.

The memory 150 stores a program to be executed by the processor 160 and information to be used for a process by the processor 160. The processor 160 includes a baseband processor that performs modulation and demodulation, encoding and decoding and the like on the baseband signal, and a CPU (Central Processing Unit) that performs various processes by executing the program stored in the memory 150. The processor 160 may further include a codec that performs encoding and decoding on sound and video signals. The processor 160 executes various processes and various communication protocols, which will be described later.

Figure 3:
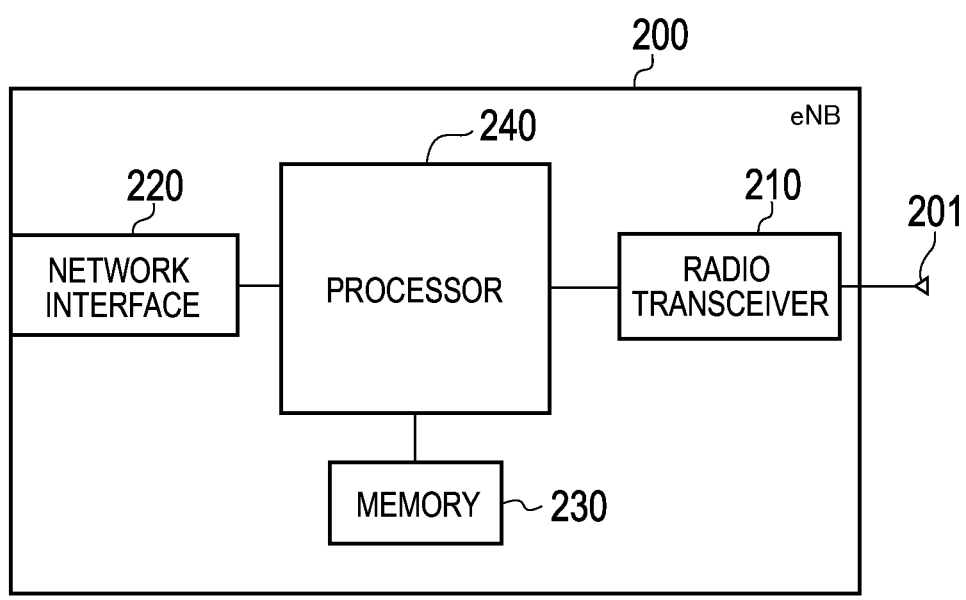
FIG. 3 is a block diagram of the eNB according to the first embodiment to the third embodiment.

FIG. 3 is a block diagram of the eNB 200. As illustrated in FIG. 3, the eNB 200 includes an antenna 201, a radio transceiver 210, a network interface 220, a memory 230, and a processor 240. The memory 230 and the processor 240 constitute a control unit.

The antenna 201 and the radio transceiver 210 are used to transmit and receive a radio signal. The radio transceiver 210 converts a baseband signal output from the processor 240 into the radio signal, and transmits the radio signal from the antenna 201.

The antenna 201 and the radio transceiver 210 configure a transmission unit. Furthermore, the radio transceiver 210 converts the radio signal received by the antenna 201 into the baseband signal, and outputs the baseband signal to the processor 240.

The network interface 220 is connected to the neighboring eNB 200 via the X2 interface and is connected to the MME/S-GW 300 via the S1 interface. The network interface 220 is used in communication performed on the X2 interface and communication performed on the S1 interface.

The memory 230 stores a program to be executed by the processor 240 and information to be used for a process by the processor 240. The processor 240 includes the baseband processor that performs modulation and demodulation, encoding and decoding and the like on the baseband signal and a CPU that performs various processes by executing the program stored in the memory 230. The processor 240 executes various processes and various communication protocols, which will be described later.

Figure 4:
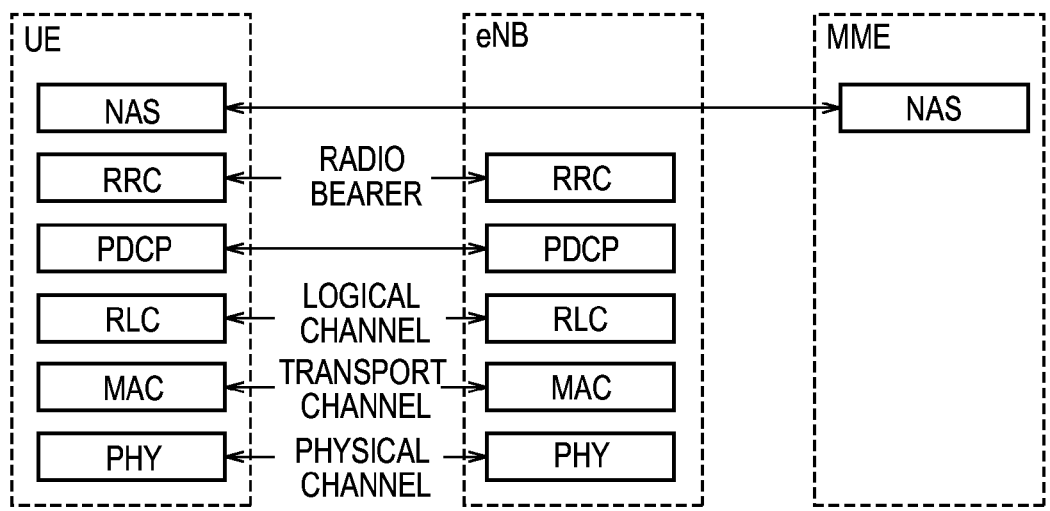
FIG. 4 is a protocol stack diagram of a radio interface in the LTE system.

FIG. 4 is a protocol stack diagram of a radio interface in the LTE system. As illustrated in FIG. 4, the radio interface protocol is classified into a layer 1 to a layer 3 of an OSI reference model, wherein the layer 1 is a physical (PHY) layer. The layer 2 includes an MAC (Media Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, data is transmitted via the physical channel.

The MAC layer performs priority control of data, and a retransmission process and the like by hybrid ARQ (HARQ). Between the MAC layer of the UE 100 and the MAC layer of the eNB 200, data is transmitted via a transport channel. The MAC layer of the eNB 200 includes a transport format of an uplink and a downlink (a transport block size and a modulation and coding scheme (MCS)) and a scheduler for determining a resource block to be assigned.

The RLC layer transmits data to an RLC layer of a reception side by using the functions of the MAC layer and the PHY layer. Between the RLC layer of the UE 100 and the RLC layer of the eNB 200, data is transmitted via a logical channel.

The PDCP layer performs header compression and decompression, and encryption and decryption.

The RRC layer is defined only in a control plane. Between the RRC layer of the UE 100 and the RRC layer of the eNB 200, a control message (an RRC message) for various types of setting is transmitted. The RRC layer controls the logical channel, the transport channel, and the physical channel in response to establishment, re-establishment, and release of a radio bearer. When there is an RRC connection between the RRC of the UE 100 and the RRC of the eNB 200, the UE 100 is in a connected state (an RRC connected state), and when there is no RRC connection, the UE 100 is in an idle state (an RRC idle state).

An NAS (Non-Access Stratum) layer positioned above the RRC layer performs session management, mobility management and the like.

Figure 5:
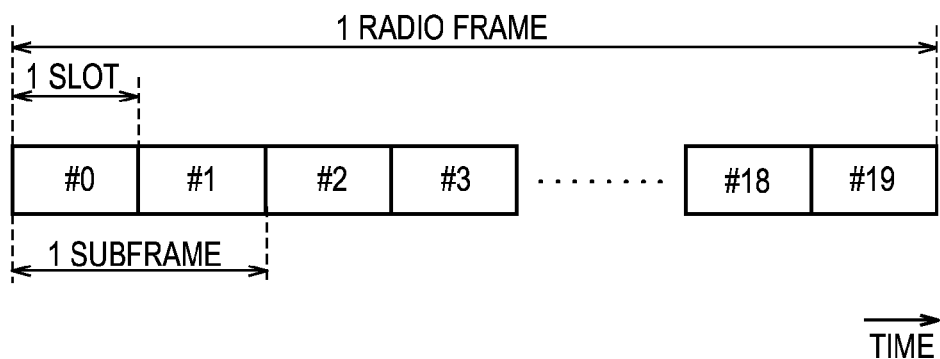
FIG. 5 is a configuration diagram of a radio frame used in the LTE system.

FIG. 5 is a configuration diagram of a radio frame used in the LTE system. In the LTE system, OFDMA (Orthogonal Frequency Division Multiplexing Access) is applied to a downlink, and SC-FDMA (Single Carrier Frequency Division Multiple Access) is applied to an uplink, respectively.

As illustrated in FIG. 5, the radio frame is configured by 10 subframes arranged in a time direction, wherein each subframe is configured by two slots arranged in the time direction. Each subframe has a length of 1 ms and each slot has a length of 0.5 ms. Each subframe includes a plurality of resource blocks (RB) in a frequency direction, and a plurality of symbols in the time direction. The resource block includes a plurality of subcarriers in the frequency direction. Among radio resources assigned to the UE 100, a frequency resource can be specified by a resource block and a time resource can be specified by a subframe (or slot).

(MDT)

The UE 100 according to the first embodiment supports Logged MDT that is a kind of the MDT. The Logged MDT includes various processes such as an MDT measurement setting (Measurement configuration), an MDT measurement (Measurement collection), and a measurement result report (Measurement reporting).

Firstly, in the MDT measurement setting, the UE 100 in a connected state receives an MDT setting message (Logged Measurement Configuration message) from a network, and stores various settings included in the MDT setting message. The various settings include a logging event, a logging period, a network absolute time, and a PLMN list (MDT PLMN list). In this case, the logging refers to a series of operations for measuring a radio environment and storing a measurement result thereof.

Further, the logging event refers to an event in which the logging should be performed. Currently, a cyclic logging is defined, and a logging cycle is designated. The logging period refers to a period during which the logging should be performed. A period is designated between a time when the MDT measurement setting is performed and a time when the MDT measurement is ended. The network absolute time is a time period that serves a reference of a time stamp added to a measurement result of a radio environment (hereinafter, briefly referred to as "measurement result"). The PLMN list (MDT PLMN List) is a list indicating a PLMN that permits the MDT measurement and the measurement result report.

For example, the PLMN list includes an identifier of each PLMN that permits the MDT measurement and the measurement result report.

Secondly, in the MDT measurement, the UE 100 in an idle state performs logging according to the MDT measurement setting (Configuration). Specifically, when an event corresponding to the logging event occurs in the PLMN included in the PLMN list, the UE 100 measures the radio environment in a serving cell (and a neighboring cell). The radio environment is reference signal received power (RSRP) and reference signal received quality (RSRQ), for example.

The UE 100 stores the measurement result, together with the location information and the time stamp. A combination of the measurement result, the location information, and the time stamp is called "measurement log". When the logging period expires, the UE 100 ends the MDT measurement and starts up a timer for defining a period (48 hours according to the specifications) during which the measurement result (measurement log) should be held.

Thirdly, in the measurement result report, notification information (referred to as "Availability indicator" according to the specifications) indicating that the measurement result is held is transmitted from the UE 100 to the network, when, for example, the UE 100 shifts from the idle state to the connected state or performs handover.

The network requests the UE 100 to transmit (report) the measurement result on the basis of the Availability indicator. The UE 100 transmits the measurement result (measurement log) to the network in response to the request from the network. The network performs network optimization such as resolution of a coverage problem, on the basis of the measurement result (measurement log) from the UE 100.

(Operation According to First Embodiment)

Figure 6:
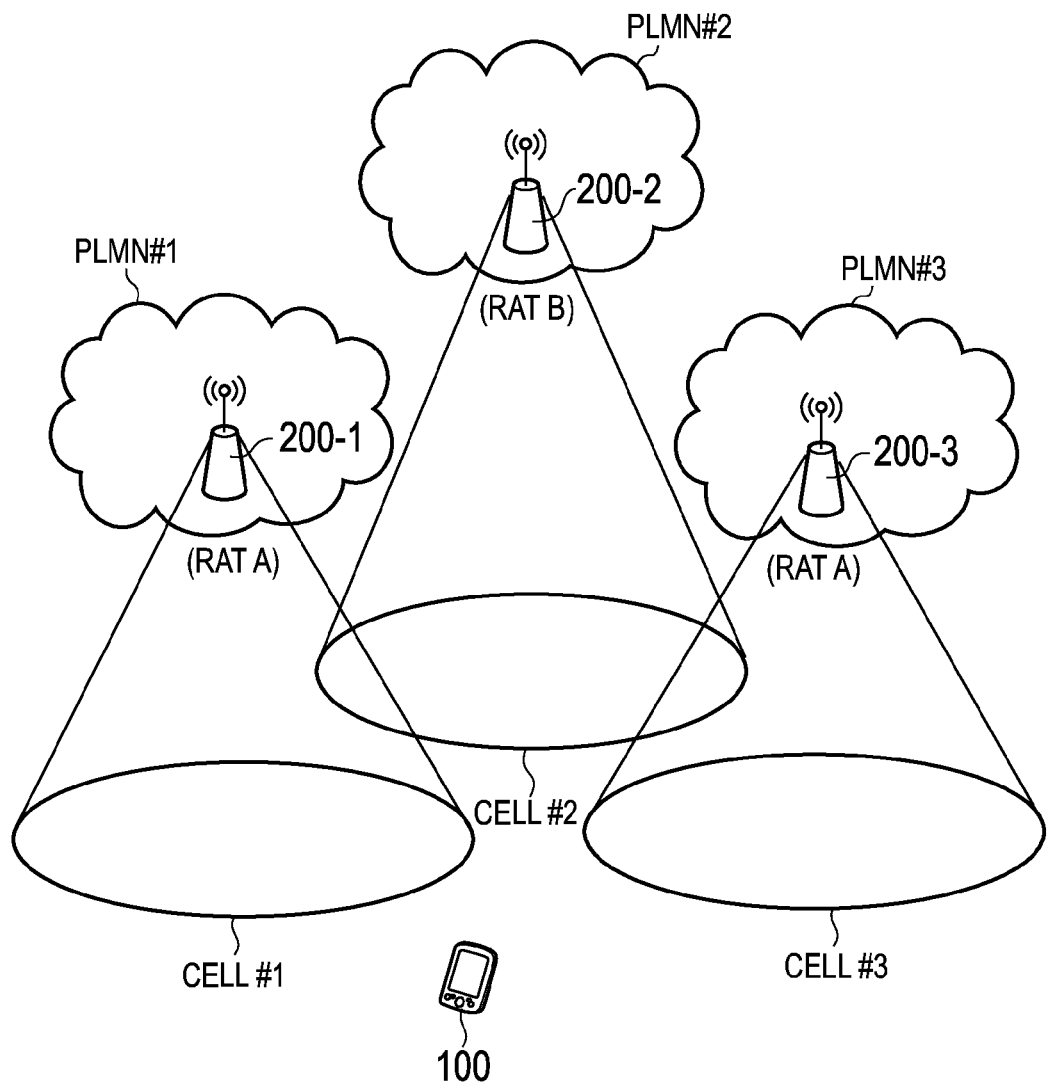
FIG. 6 is a diagram showing an operation environment according to the first embodiment to the third embodiment.

FIG. 6 is a diagram showing an operation environment according to the first embodiment. As shown in FIG. 6, a plurality of PLMNs (PLMNs#1 to #3) different in operators are arranged.

Each of the PLMNs#1 and #3 is a network belonging to an RAT A, and the PLMN#2 is a network belonging to an RAT B. For example, the RAT A is LTE, and the RAT B is W-CDMA (UMTS: Universal Mobile Telecommunications System).

It is noted that, in the UMTS, the base station is called NB (Node-B), and thus, when the eNB and the NB are not particularly distinguished, these are simply called "base station" in the following description. Each PLMN includes one or more cells. Each cell is managed by the base station 200. Each cell broadcasts an identifier of the cell itself and an identifier of the PLMN including the cell itself.

As described above, in the Logged MDT, the UE 100 to which the PLMN list is set performs the MDT measurement in the PLMN included in the PLMN list. However, the UE 100 is not capable of performing the MDT measurement in the PLMN not belonging to the RAT on which the UE 100 supports the MDT measurement (hereinafter, referred to as "MDT support RAT").

(1) MDT Measurement Setting and MDT Measurement

FIG. 7 is an operation sequence diagram of the MDT measurement setting according to the first embodiment.

As shown in FIG. 7, in step S101, the UE 100 in a connected state transmits the RAT information on the MDT support RAT of the UE 100, to a base station 200-1. The base station 200-1 receives the RAT information. In the first embodiment, the RAT information is included in capability information (UE capability) indicating a capability of the UE 100.

Thus, the UE 100 notifies the base station 200-1 of the RAT information, before the PLMN list is set (that is, before the MDT measurement setting is performed). The UE 100 may notify the base station 200-1 of the RAT information in response to the reception of a notification request for the RAT information from the base station 200-1.

The base station 200-1 or an upper device thereof creates the PLMN list set to the UE 100 on the basis of the RAT information from the UE 100. In this case, the upper device of the base station is, for example, MME or OAM (Operation And Maintenance). The base station 200-1 or the upper device thereof corresponds to a network device.

The base station 200-1 or the upper device thereof preferably includes only the PLMN belonging to the MDT support RAT of the UE 100 in the PLMN list on the basis of the RAT information from the UE 100. For example, the base station 200-1 or the upper device thereof does not include the PLMN#2 in the PLMN list but includes the PLMNs#1 and #3 in the PLMN list, when the MDT support RAT of the UE 100 is the RAT A.

In step S102, the base station 200-1 transmits the MDT setting message including the PLMN list to the UE 100. The UE 100 stores the PLMN list included in the MDT setting message. Thereafter, the UE 100 in an idle state performs the MDT measurement in the PLMN included in the set PLMN list.

Thus, the base station 200-1 or the upper device thereof creates the PLMN list on the basis of the RAT information such that the PLMN list does not include the PLMN not belonging to the MDT support RAT.

It is noted that the base station 200-1 or the upper device thereof may not necessarily be capable of including only the PLMN belonging to the MDT support RAT of the UE 100 in the PLMN list. When the PLMN not belonging to the MDT support RAT of the UE 100 is included in the PLMN list, the UE 100 performs a first operation and a second operation below for the MDT measurement.

In the first operation, when the PLMN list includes a first PLMN belonging to the MDT support RAT and a second PLMN not belonging to the MDT support RAT, the UE 100 does not perform the MDT measurement in the second PLMN but performs the MDT measurement in the first PLMN. For example, when the MDT support RAT of the UE 100 is the RAT A and the PLMN list includes the PLMNs#1 to #3, the UE 100 does not perform the MDT measurement in the PLMN#2 but performs the MDT measurement in the PLMNs#1 and #3.

In the second operation, the UE 100 does not perform the MDT measurement when the set PLMN list is recognized as an error. In this case, the UE 100 may notify the network that an inappropriate PLMN list is set.

(2) Measurement Result Report

In the first embodiment, the UE 100 transmits the Availability indicator indicating that the measurement result (measurement log) is held and the identification information indicating the RAT corresponding to the measurement result (hereinafter, referred to as "RAT identifier"). The network acquires only the measurement result corresponding to the RAT that can be acquired by the network, on the basis of the RAT identifier.

FIG. 8 is a sequence diagram showing an operation pattern 1 of the measurement result report according to the first embodiment. In the operation pattern 1, the UE 100 holds only the measurement result of the RATA. The base station 200-1, which is a base station belonging to the RAT A, is capable of acquiring the measurement result held by the UE 100.

As shown in FIG. 8, in step S201, the UE 100 transmits to the base station 200-1, the RAT identifier indicating the RAT A corresponding to the measurement result together with the Availability indicator.

In step S202, the base station 200-1 transmits to the UE 100, a transmission request for the measurement result held by the UE 100, on the basis of the RAT identifier indicating the RAT A. In this case, the base station 200-1 performs the transmission request in which the RAT A is designated.

In step S203, the UE 100 transmits the measurement result of the RAT A to the base station 200-1, in response to the transmission request from the base station 200-1.

It is noted that the UE 100 does not hold the measurement result transmitted to the network, and is capable of deleting the same.

FIG. 9 is a sequence diagram showing an operation pattern 2 of the measurement result report according to the first embodiment. In the operation pattern 2, the UE 100 holds only the measurement result of the RAT A. A base station 200-2, which is a base station belonging to the RAT B, is not capable of acquiring the measurement result held by the UE 100.

As shown in FIG. 9, in step S211, the UE 100 transmits to the base station 200-1, the RAT identifier indicating the RAT A corresponding to the measurement result together with the Availability indicator.

In step S212, the base station 200-1 does not request a transmission of the measurement result, on the basis of the RAT identifier indicating the RAT A.

In step S213, the UE 100 does not transmit but holds the measurement result of the RAT A because there is no transmission request from the base station 200-1.

Figure 10:
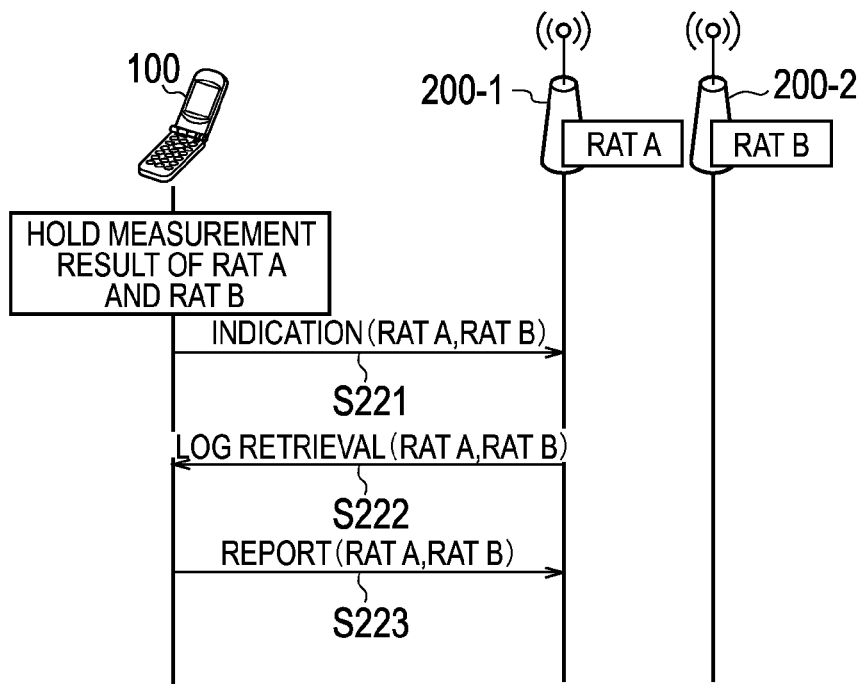
FIG. 10 is a sequence diagram showing an operation pattern 3 of the measurement result report according to the first embodiment.

FIG. 10 is a sequence diagram showing an operation pattern 3 of the measurement result report according to the first embodiment. In the operation pattern 3, the UE 100 holds the measurement result of each of the RAT A and the RAT B. Further, the base station 200-1, which is a base station belonging to the RAT A, is capable of acquiring the measurement result of the RAT B.

As shown in FIG. 10, in step S221, the UE 100 transmits to the base station 200-1, the RAT identifier indicating the RAT A and the RAT identifier indicating the RAT B together with the Availability indicator.

In step S222, the base station 200-1 transmits to the UE 100, the transmission request for the measurement result of each of the RAT A and the RAT B, on the basis of the RAT identifier indicating the RAT A and the RAT identifier indicating the RAT B. In this case, the base station 200-1 performs the transmission request in which the RAT A and the RAT B are designated.

In step S223, the UE 100 transmits to the base station 200-1, the measurement result of each of the RAT A and the RAT B, in response to the transmission request from the base station 200-1.

Figure 11:
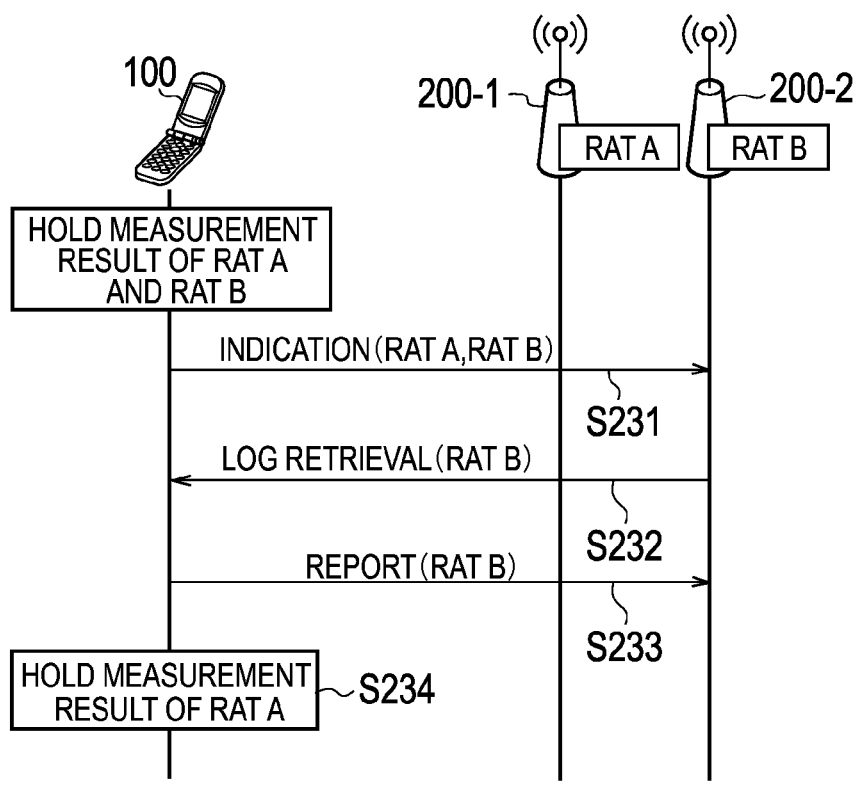
FIG. 11 is a sequence diagram showing an operation pattern 4 of the measurement result report according to the first embodiment.

FIG. 11 is a sequence diagram showing an operation pattern 4 of the measurement result report according to the first embodiment. In the operation pattern 4, the UE 100 holds the measurement result of each of the RAT A and the RAT B.

As shown in FIG. 11, in step S231, the UE 100 transmits to the base station 200-2, the RAT identifier indicating the RAT A and the RAT identifier indicating the RAT B together with the Availability indicator.

In step S232, the base station 200-2 transmits to the UE 100, the transmission request for the measurement result of the RAT B that can be acquired by the base station 200-2, on the basis of the RAT identifier indicating the RAT A and the RAT identifier indicating the RAT B. In this case, the base station 200-2 performs the transmission request in which the RAT B is designated.

In step S233, the UE 100 transmits the measurement result of the RAT B to the base station 200-2, in response to the transmission request from the base station 200-2.

In step S234, the UE 100 does not transmit but holds the measurement result of the RAT A because there is no transmission request for the measurement result of the RAT A from the base station 200-2.

Second Embodiment

Next, in a second embodiment, a difference from the first embodiment will be mainly described.

The second embodiment is different from the first embodiment, in operation of the measurement result report. In the second embodiment, the UE 100 does not transmit the RAT identifier indicating the RAT corresponding to the measurement result, together with the Availability indicator.

However, the network requests the UE 100 to transmit the measurement result on all the RATs that can be acquired by the network. When the UE 100 receives from the network, a measurement result transmission request on the RAT other than the RAT corresponding to the measurement result, the UE 100 transmits to the network, information indicating that the UE 100 does not hold the measurement result.

FIG. 12 is a sequence diagram showing an operation pattern 1 of the measurement result report according to the second embodiment. In the operation pattern 1, the UE 100 holds only the measurement result of the RAT A. Although belonging to the RAT A, the base station 200-1 is capable of acquiring the measurement result of each of the RAT A and the RAT B.

As shown in FIG. 12, in step S301, the UE 100 transmits the Availability indicator to the base station 200-1.

In step S302, the base station 200-1 transmits to the UE 100, the transmission request for the measurement result of each of the RAT A and the RAT B, on the basis of the Availability indicator. In this case, the base station 200-1 performs the transmission request in which the RAT A and the RAT B are designated.

In step S303, the UE 100 transmits the measurement result of the RAT A to the base station 200-1, in response to the transmission request from the base station 200-1.

FIG. 13 is a sequence diagram showing an operation pattern 2 of the measurement result report according to the second embodiment. In the operation pattern 2, the UE 100 holds only the measurement result of the RAT A.

As shown in FIG. 13, in step S311, the UE 100 transmits the Availability indicator to the base station 200-2.

In step S312, the base station 200-2 transmits to the UE 100, a transmission request for the measurement result of the RAT B, on the basis of the Availability indicator. In this case, the base station 200-2 performs the transmission request in which the RAT B is designated.

In step S313, the UE 100 does not hold the measurement result of the RAT B, and thus, transmits to the base station 200-2, information indicating that the UE 100 does not hold the measurement result (Null information).

In step S314, the UE 100 does not transmit but holds the measurement result of the RAT A because there is no transmission request for the measurement result of the RAT A from the base station 200-2.

Figure 14:
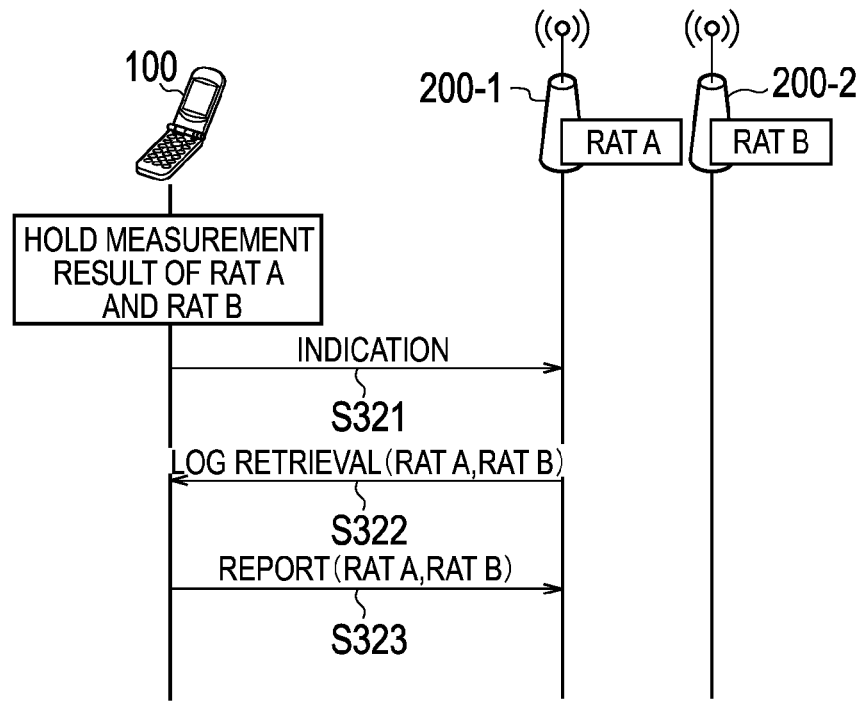
FIG. 14 is a sequence diagram showing an operation pattern 3 of the measurement result report according to the second embodiment.

FIG. 14 is a sequence diagram showing an operation pattern 3 of the measurement result report according to the second embodiment. In the operation pattern 3, the UE 100 holds the measurement result of each of the RAT A and the RAT B. Although belonging to the RAT A, the base station 200-1 is capable of acquiring the measurement result of each of the RAT A and the RAT B.

As shown in FIG. 14, in step S321, the UE 100 transmits the Availability indicator to the base station 200-1.

In step S322, the base station 200-1 transmits to the UE 100, the transmission request for the measurement result of each of the RAT A and the RAT B, on the basis of the Availability indicator. In this case, the base station 200-1 performs the transmission request in which the RAT A and the RAT B are designated.

In step S323, the UE 100 transmits the measurement result of each of the RAT A and the RAT B to the base station 200-1, in response to the transmission request from the base station 200-1.

Figure 15:
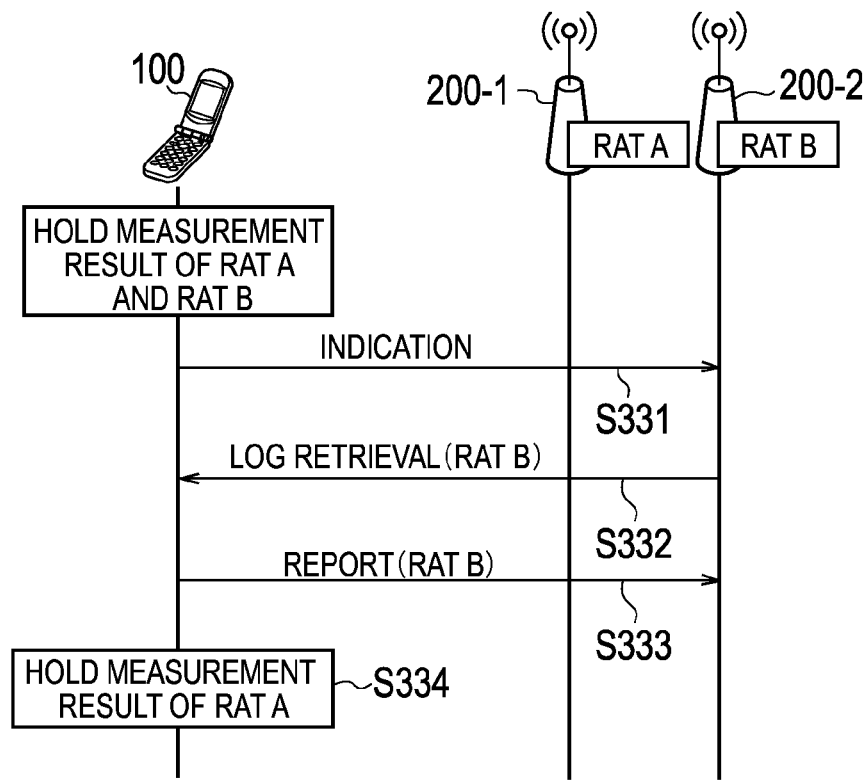
FIG. 15 is a sequence diagram showing an operation pattern 4 of the measurement result report according to the second embodiment.

FIG. 15 is a sequence diagram showing an operation pattern 4 of the measurement result report according to the second embodiment. In the operation pattern 4, the UE 100 holds the measurement result of each of the RAT A and the RAT B.

As shown in FIG. 15, in step S331, the UE 100 transmits the Availability indicator to the base station 200-2.

In step S332, the base station 200-2 transmits to the UE 100, a transmission request for the measurement result of the RAT B, on the basis of the Availability indicator. In this case, the base station 200-2 performs the transmission request in which the RAT B is designated.

In step S333, the UE 100 transmits the measurement result of the RAT B to the base station 200-2, in response to the transmission request from the base station 200-2.

In step S334, the UE 100 does not transmit but holds the measurement result of the RAT A because there is no transmission request for the measurement result of the RAT A from the base station 200-2.

Third Embodiment

Next, in a third embodiment, a difference from the first embodiment will be mainly described.

In the third embodiment, the operation of the measurement result report is different from that of the first embodiment. In the third embodiment, the UE 100 does not transmit the identification information indicating the RAT corresponding to the measurement result, together with the Availability indicator.

However, when the measurement result from the UE 100 includes the measurement results of a plurality of RATs, the network transmits to the UE 100, deletion control information indicating whether or not to permit deletion of the measurement result on each of the plurality of RATs. That is, whether or not to delete the measurement result is decided by the network.

Figure 16:
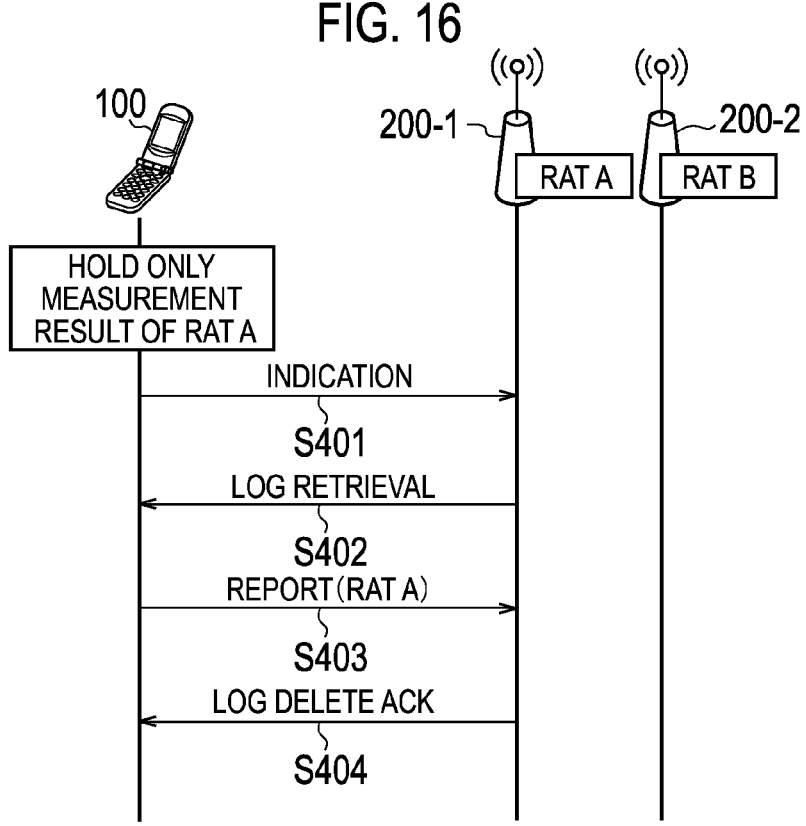
FIG. 16 is a sequence diagram showing an operation pattern 1 of the measurement result report according to the third embodiment.

FIG. 16 is a sequence diagram showing an operation pattern 1 of the measurement result report according to the third embodiment. In the operation pattern 1, the UE 100 holds only the measurement result of the RAT A.

As shown in FIG. 16, in step S401, the UE 100 transmits the Availability indicator to the base station 200-1.

In step S402, the base station 200-1 transmits to the UE 100, a transmission request for the measurement result, on the basis of the Availability indicator.

In step S403, the UE 100 transmits the measurement result of the RAT A to the base station 200-1, in response to the transmission request from the base station 200-1.

In step S404, the base station 200-1 transmits to the UE 100, the deletion control information that permits deletion of the measurement result. The UE 100 deletes the measurement result in response to deletion of the measurement result being permitted.

Figure 17:
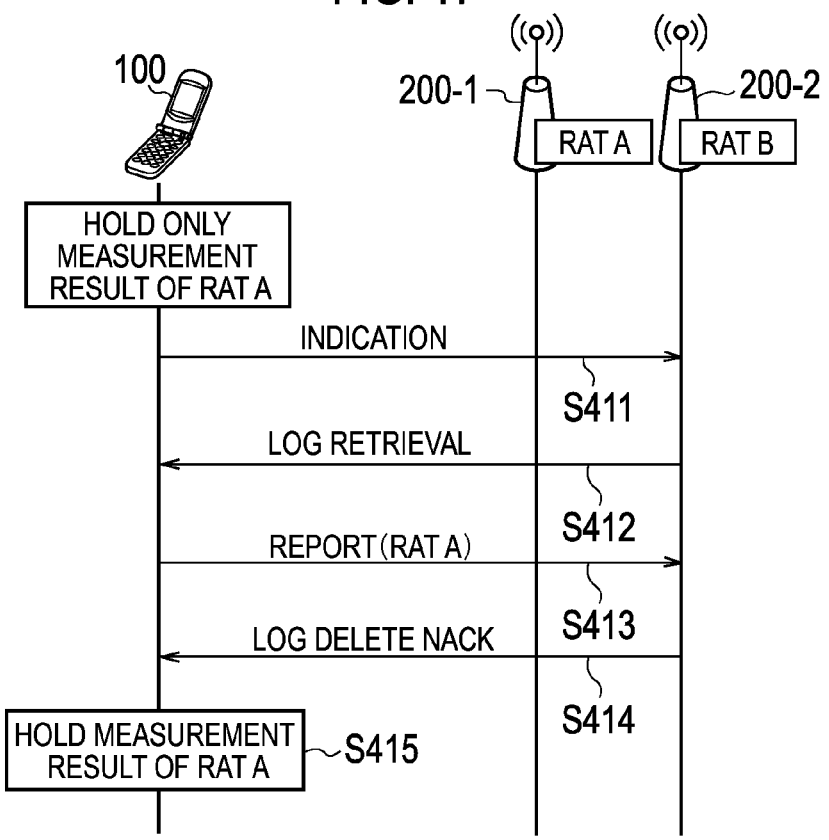
FIG. 17 is a sequence diagram showing an operation pattern 2 of the measurement result report according to the third embodiment.

FIG. 17 is a sequence diagram showing an operation pattern 2 of the measurement result report according to the third embodiment. In the operation pattern 2, the UE 100 holds only the measurement result of the RAT A.

As shown in FIG. 17, in step S411, the UE 100 transmits the Availability indicator to the base station 200-2.

In step S412, the base station 200-2 transmits to the UE 100, a transmission request for the measurement result, on the basis of the Availability indicator.

In step S413, the UE 100 transmits the measurement result of the RAT A to the base station 200-2, in response to the transmission request from the base station 200-2.

In step S414, the base station 200-2 transmits to the UE 100, the deletion control information that does not permit deletion of the measurement result.

In step S415, the UE 100 does not delete but holds the measurement result of the RAT A because deletion of the measurement result is not permitted.

FIG. 18 is a sequence diagram showing an operation pattern 3 of the measurement result report according to the third embodiment. In the operation pattern 3, the UE 100 holds the measurement result of each of the RAT A and the RAT B. Although belonging to the RAT A, the base station 200-1 is capable of acquiring the measurement result of each of the RAT A and the RAT B.

As shown in FIG. 18, in step S421, the UE 100 transmits the Availability indicator to the base station 200-1.

In step S422, the base station 200-1 transmits to the UE 100, a transmission request for the measurement result, on the basis of the Availability indicator.

In step S423, the UE 100 transmits the measurement result of each of the RAT A and the RAT B to the base station 200-1, in response to the transmission request from the base station 200-1.

In step S424, the base station 200-1 transmits to the UE 100, the deletion control information that permits deletion of the measurement result. The UE 100 deletes the measurement result of each of the RAT A and the RAT B in response to permission of deletion of the measurement result.

FIG. 19 is a sequence diagram showing an operation pattern 4 of the measurement result report according to the third embodiment. In the operation pattern 4, the UE 100 holds the measurement result of each of the RAT A and the RAT B.

As shown in FIG. 19, in step S431, the UE 100 transmits the Availability indicator to the base station 200-2.

In step S432, the base station 200-2 transmits to the UE 100, a transmission request for the measurement result, on the basis of the Availability indicator.

In step S433, the UE 100 transmits the measurement result of each of the RAT A and the RAT B to the base station 200-2, in response to the transmission request from the base station 200-2.

In step S434, the base station 200-2 transmits to the UE 100, the deletion control information that does not permit deletion of the measurement result for the RAT A but permits deletion of the measurement result for the RAT B.

In step S435, according to the deletion control information, the UE 100 does not delete but holds the measurement result of the RAT A, and deletes that of the RAT B.

Other Embodiments

In each of the above-described embodiments, as a specific example of the RAT, LTE and UMTS are described; however, the RAT is not limited thereto and another RAT may be applicable.

The operation of the measurement result report according to each of the above-described embodiments may apply not only to the Logged MDT but also to Immediate MDT. In the Immediate MDT, the UE 100 in a connected state performs measurement (MDT measurement) of the radio environment, and immediately reports the measurement result, together with location information, to the network.

Thereby, the present invention includes various embodiments which are not described here. Furthermore, it is possible to combine the embodiments and the modifications described above. Accordingly, the technique scope of the present invention should be merely determined with reference to the matters used to specify the present invention according to the appropriate claims from the above description.

Note that the entire content of the U.S. Provisional Application No. 61/805,028 (filed on Mar. 25, 2013) is incorporated in the present application by reference.

INDUSTRIAL APPLICABILITY

According to the present invention, it is possible to provide a communication control method, a user terminal, a network device, and a base station, with which it is possible to appropriately control an MDT measurement in a plurality of PLMNs.

The invention claimed is:

1. A communication control method, comprising:

a step A of notifying, by a user terminal, when the user terminal is in a connected state, a network apparatus of RAT information on a radio access technology (RAT) on which the user terminal supports an MDT measurement;

a step B of setting to the user terminal, by the network apparatus, a PLMN (public land mobile network) list indicating a public land mobile network that permits the MDT measurement, on the basis of the RAT information;

a step D of transmitting to a base station, by the user terminal, notification information indicating that the user terminal holds a plurality of measurement results for different RATs and identification information indicating an RAT corresponding to each of the plurality of measurement results;

a step F of transmitting to the base station, by the user terminal, a measurement result report;

a step G of determining, by the base station, whether the measurement result report received from the user terminal includes the plurality of measurement results corresponding to a plurality of RATs; and a step H of transmitting to the user terminal, by the base station, control information indicating whether or not to permit deletion of a measurement result corresponding to one of the plurality of RATs, in response to the determination that the measurement result report received from the user terminal includes the plurality of measurement results corresponding to the plurality of RATs.

2. The communication control method according to claim 1, further comprising:

a step C of performing, by the user terminal, when the user terminal is in an idle state, the MDT measurement in a PLMN included in the PLMN list set on the basis of the RAT information.

3. The communication control method according to claim 1, wherein the user terminal notifies the network apparatus of the RAT information, in response to reception of a notification request for the RAT information from the network apparatus.

4. The communication control method according to claim 1, wherein the PLMN list includes only a PLMN belonging to the RAT.

5. The communication control method according to claim 2, wherein when the PLMN list includes a first PLMN belonging to the RAT and a second PLMN not belonging to the RAT, the user terminal prohibits performing the MDT measurement in the second PLMN and performs the MDT measurement in the first PLMN.

6. The communication control method according to claim 2, further comprising:

a step E of transmitting to the base station, by the user terminal that holds a first measurement result by the MDT measurement, information indicating that the user terminal does not hold a second measurement result, when the user terminal receives from the base station, a transmission request of the second measurement result, wherein the second measurement result is a measurement result for an RAT other than an RAT corresponding to the first measurement result.

7. A base station, comprising:

a receiver configured to receive from a user terminal, notification information indicating that the user terminal holds a plurality of measurement results for different RATs and identification information indicating an RAT corresponding to each of the plurality of measurement results, wherein the receiver is further configured to receive a measurement result report from the user terminal, and a controller configured to determine whether the measurement result report received from the user terminal includes the plurality of measurement results corresponding to a plurality of RATs, and transmit to the user terminal, control information indicating whether or not to permit deletion of a measurement result corresponding to one of the plurality of RATs, in response to the determination that the measurement result report received from the user terminal includes the plurality of measurement results corresponding to the plurality of RATs.

* * * * *